US012651278B2

(12) United States Patent
Fujisawa et al.

(10) Patent No.: US 12,651,278 B2
(45) Date of Patent: Jun. 9, 2026

(54) POWER MANAGEMENT SYSTEM

(71) Applicant: TOYOTA JIDOSHA KABUSHIKI KAISHA, Toyota (JP)

(72) Inventors: Hisashi Fujisawa, Toyota (JP); Shigeki Kinomura, Toyota (JP); Atsushi Oki, Nagoya (JP); Hiroki Takabatake, Chiryu (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 358 days.

(21) Appl. No.: 18/364,909

(22) Filed: Aug. 3, 2023

(65) Prior Publication Data

US 2024/0046300 A1 Feb. 8, 2024

(30) Foreign Application Priority Data

Aug. 5, 2022 (JP) ................................. 2022-125660

(51) Int. Cl.
*G06Q 30/0235* (2023.01)
*G06Q 10/02* (2012.01)
(Continued)

(52) U.S. Cl.
CPC ......... *G06Q 30/0235* (2013.01); *G06Q 10/02* (2013.01); *G06Q 10/06315* (2013.01);
(Continued)

(58) Field of Classification Search
CPC ............... G06Q 30/0235; G06Q 10/02; G06Q 10/06315; G06Q 30/0236; G06Q 30/0215;
(Continued)

(56) References Cited

U.S. PATENT DOCUMENTS

2002/0062236 A1* 5/2002 Murashita .............. G06Q 10/02
705/5
2008/0281663 A1* 11/2008 Hakim .................... H02J 3/466
705/7.25
(Continued)

FOREIGN PATENT DOCUMENTS

JP 2015-231324 A 12/2015
JP 2020-115087 A 7/2020
KR 20210011630 A * 2/2021 ............. G06Q 50/06

OTHER PUBLICATIONS

Sebastian Wagner, "Optimal Location of Charging Stations in Smart Cities: a Point of Interest Based Approach, 2013, University of Freiburg, Germany" (Year: 2013).*

*Primary Examiner* — Santosh R Poudel
(74) *Attorney, Agent, or Firm* — Finnegan, Henderson, Farabow, Garrett and Dunner, LLP

(57) ABSTRACT

A power management system includes: a server that manages a status of reservation for use of a shop by a user who uses an electrically powered vehicle in which a battery is mounted and that performs supply/demand adjustment for power in a power grid connected to the shop; and a power charging/discharging station installed in a parking lot of the shop and connected to the power grid. The server performs the supply/demand adjustment using the battery of the electrically powered vehicle while the battery and the power charging/discharging station are connected to each other after the reservation for the use of the shop is made by the user.

2 Claims, 6 Drawing Sheets

(51) Int. Cl.
   *G06Q 10/0631*       (2023.01)
   *G06Q 30/0207*       (2023.01)
   *B60L 53/68*          (2019.01)
   *B60L 55/00*          (2019.01)
   *G06Q 50/06*          (2012.01)

(52) U.S. Cl.
   CPC .......... *G06Q 30/0236* (2013.01); *B60L 53/68*
         (2019.02); *B60L 55/00* (2019.02); *G06Q*
         *30/0215* (2013.01); *G06Q 50/06* (2013.01);
                  *G06Q 2240/00* (2013.01)

(58) Field of Classification Search
   CPC .... G06Q 50/06; G06Q 2240/00; B60L 53/68;
         B60L 55/00; B60L 53/63; B60L 53/65;
         B60L 53/665; B60L 53/67; B60L 53/14;
                  B60L 53/60; B60L 53/66
   See application file for complete search history.

(56)                References Cited

U.S. PATENT DOCUMENTS

2012/0245750 A1*   9/2012   Paul ........................ H02J 3/003
                                                          700/291
2020/0094691 A1*   3/2020   Vidhi ................... G07F 15/005
2020/0234575 A1    7/2020   Hishida et al.
2021/0331600 A1*  10/2021   Hishida ................... B60L 55/00
2022/0194257 A1*   6/2022   Hamada ................. B60L 53/67
2024/0265808 A1*   8/2024   Wojdylo ............... G08G 1/146

* cited by examiner

<SERVER>

START

S400
CONTROL RESERVE REWARD RECEIVED?

NO

YES

S402
PERFORM REWARD ALLOCATION PROCESS

S404
TRANSMIT ALLOCATED REWARD

RETURN

<SHOP TERMINAL>

START

S500
ALLOCATED REWARD RECEIVED?

NO

YES

S502
SET BENEFIT FOR USER HAVING MADE RESERVATION

S504
NOTIFY PROVISION OF BENEFIT TO USER HAVING MADE RESERVATION

RETURN

POWER MANAGEMENT SYSTEM

CROSS REFERENCE TO RELATED APPLICATIONS

This nonprovisional application is based on Japanese Patent Application No. 2022-125660 filed on Aug. 5, 2022 with the Japan Patent Office, the entire contents of which are hereby incorporated by reference.

BACKGROUND

Field

The present disclosure relates to a power management system.

Description of the Background Art

There is a facility in which a power charging station is installed to supply power to a power storage device mounted in an electrically powered vehicle. In order to efficiently charge power storage devices mounted in a plurality of electrically powered vehicles that visit such a facility, a time slot for use is reserved in advance, and a power storage device of a corresponding vehicle is charged in the reserved time slot. Thus, a waiting time due to charging of another electrically powered vehicle can be suppressed from being increased. When there are a plurality of such power charging stations, it is required to appropriately manage a status of reservation.

For example, Japanese Patent Laying-Open No. 2015-231324 discloses the following technology: vehicle identification information, a parking time, and an amount of power to be used are received from a user as reservation information and a plan for supplying power to vehicles in a plurality of stations is established using power at a peak of power demand and the reservation information.

SUMMARY

Since the user who has reserved the use of the power charging station as described above tends to make a reservation to use it in a spare time, the reservation for the use of the power charging station may be canceled when another event comes up in that spare time. Therefore, the facility such as the power charging station may be unable to be used efficiently.

It is an object of the present disclosure to provide a power management system to efficiently use a facility such as a power charging station.

A power management system according to an aspect of the present disclosure includes: a power charging/discharging station installed in a parking space of a facility and connected to a power grid; and a server that manages a status of reservation of the facility by a user who uses a vehicle in which a power storage device is mounted and that performs supply/demand adjustment for power in the power grid. The server performs the supply/demand adjustment using the power storage device of the vehicle while the power storage device and the power charging/discharging station are connected to each other after the reservation for use of the facility is made by the user.

With this, there is a low possibility that the user having made the reservation puts another event on his/her schedule in the time slot for which the user has reserved the use of the facility. Therefore, since the supply/demand adjustment using the power storage device is performed while the power storage device and the power charging/discharging station are connected to each other, the electrically powered vehicle can be suppressed from leaving during the supply/demand adjustment, with the result that the power charging/discharging station can be efficiently used.

In an embodiment, the server includes a first server that manages the status of reservation, and a second server that is capable of communicating with the first server and that performs the supply/demand adjustment. The second server transmits, to the first server, information specifying the user who uses the vehicle used for the supply/demand adjustment. The first server performs, using the information received from the second server, a process of providing the user with a reward corresponding to a contribution to the supply/demand adjustment.

With this, since the process of providing the user with the reward corresponding to the contribution to the supply/demand adjustment is performed, the user can receive the reward. Therefore, the number of users of the facility can be increased.

Further, in an embodiment, when the reservation for the use of the facility is made by the user, the second server sets, within a time slot of the reservation, a period during which the supply/demand adjustment is to be performed.

With this, since the period during which the supply/demand adjustment is to be performed is set within the time slot of the reservation for the use of the facility by the user, the power storage device of the vehicle can be used for the supply/demand adjustment while avoiding the vehicle from leaving during the supply/demand adjustment.

Further, in an embodiment, when the first server receives, from the second server, information about a time slot in which a reward for the supply/demand adjustment is to be obtained, the first server provides information for promoting the use of the facility in the time slot.

With this, by providing the information for promoting the use of the facility in the time slot in which the reward for the supply/demand adjustment is to be obtained, the facility can be used by the user in the time slot, with the result that the power storage device of the vehicle can be used for the supply/demand adjustment.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
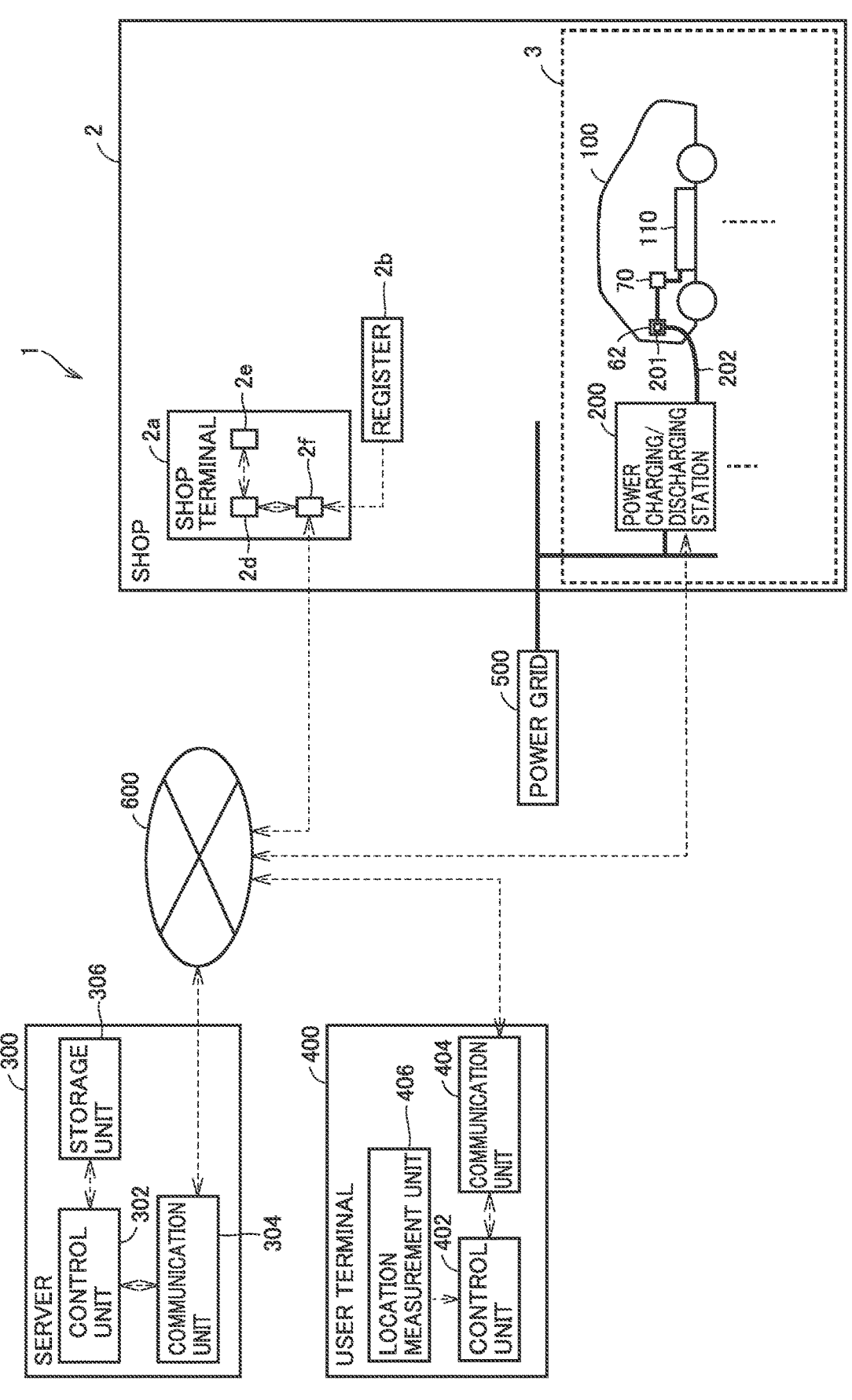
FIG. 1 is a diagram showing an exemplary configuration of a power management system according to the present embodiment.

Hereinafter, embodiments of the present disclosure will be described in detail with reference to figures. It should be noted that in the figures, the same or corresponding portions are denoted by the same reference characters and will not be described repeatedly.

FIG. 1 is a diagram showing an exemplary configuration of a power management system 1 according to the present embodiment. As shown in FIG. 1, power management system 1 according to the present embodiment includes a shop terminal 2a, a power charging/discharging station 200, an electrically powered vehicle 100, a server 300, a user terminal 400, and a communication network 600. It should be noted that power charging/discharging station 200 is provided at each of a plurality of locations in a parking lot 3 of shop 2, and one power charging/discharging station 200 is representatively shown in FIG. 1.

Shop 2 is a facility for providing various types of products or various types of services to a user, such as a facility for which the user can make reservation for use in advance. Shop 2 includes, for example, a beauty salon, a restaurant, a public bath, a movie theater, an accommodation facility, or a composite facility thereof.

At shop 2, a shop terminal 2a, a register 2b, parking lot 3, and a power charging/discharging station 200 are installed. Power is supplied from a power grid 500 to various types of electric devices installed in shop 2.

Shop terminal 2a accepts reservation information of a user (customer) who is to use shop 2, stores information about a benefit to be provided to the user, and provides server 300 with the reservation information of the user and information about a user who is using shop 2. Shop terminal 2a corresponds to a "first server".

Register 2b performs, for example, a payment process, a settlement process, a point provision process, or the like at the time of sale/purchase transaction of a product between a clerk of shop 2 and a user of shop 2 or after providing a service. Register 2b stores payment information generated by the payment process, settlement information generated by the settlement process, or point information, and exchanges these pieces of information with shop terminal 2a. The payment process and the settlement process include, for example, a payment process and a settlement process with electronic money through a user terminal or the like. The point provision process includes, for example, a process of adding new point information to point information stored in user terminal 400 of the user, the new point information being based on the information, stored in shop terminal 2a, about the benefit. Each of the payment information and the settlement information includes: information about the shop in which the sales/purchase transaction or provision of service is performed; information about a sold/purchased product or a history of use of service; information about the user; and the like.

Electrically powered vehicle 100 is, for example, a battery electric vehicle including an inlet 62, a power conversion device 70, and a battery 110 that stores power for traveling. FIG. 1 shows a case where electrically powered vehicle 100 is parked in, for example, a parking space in parking lot 3.

A power line, which is branched from a power line installed in shop 2 and connected to power grid 500, is connected to power charging/discharging station 200. One end of a cable 202 is connected to power charging/discharging station 200. A connector 201 is connected to the other end of cable 202. Connector 201 has a structure connectable to electrically powered vehicle 100. FIG. 1 shows a case where connector 201 is connected to inlet 62 of electrically powered vehicle 100, for example.

By connecting connector 201 to inlet 62, power can be exchanged between power charging/discharging station 200 and electrically powered vehicle 100.

Server 300 is, for example, a server operated by a low-level aggregator (resource aggregator) entity. The low-level aggregator is a business entity that directly controls a small-scale power supply facility such as power charging/discharging station 200 in response to a request (hereinafter also referred to as DR (Demand Response) request) for supply/demand adjustment for power as received from an upper layer (for example, a high-level aggregator (aggregation coordinator), a power transmission/distribution entity (power company), or the like). When the low-level aggregator performs the supply/demand adjustment using the small-scale power supply facility in accordance with the DR request, the low-level aggregator provides an owner of each small-scale power supply facility with an incentive corresponding to the contribution. It should be noted that the incentive may be provided from the power transmission/distribution entity to the owner of each small-scale power supply facility via the aggregator. Server 300 corresponds to a "second server".

Server 300 is configured to communicate with shop terminal 2a, electrically powered vehicle 100, and a below-described user terminal 400 via communication network 600. Server 300 manages power exchanged between a power storage device in shop 2 and power grid 500.

The exchange of power between the power storage device in shop 2 and power grid 500 includes at least one of: feeding/halting of feeding of power from the power storage device to power grid 500; and feeding/halting of feeding of power from power grid 500 to the power storage device.

Server 300 is configured to instruct power charging/discharging station 200 to perform at least one of: charging of battery 110 mounted in electrically powered vehicle 100 connected to power charging/discharging station 200; feeding of power from battery 110; halting of charging of battery 110; and halting of feeding of power from battery 110.

User terminal 400 is carried by each user, and includes, for example, at least one of the following mobile terminals: a mobile phone, a smartphone, and a smart watch.

User terminal 400 is configured to communicate with shop terminal 2a via a wireless communication base station installed in shop 2 or outside shop 2 and communication network 600 including the Internet. User terminal 400 is configured to communicate with the wireless communication base station in a predetermined communication method. The predetermined communication method includes, for example, wireless communication compliant with a wireless communication method employing a wireless communication standard such as wireless LAN (Local Area Network) or 3G, 4G, or 5G for mobile phones.

User terminal 400 is provided with, for example, a location measurement unit 406. User terminal 400 can acquire location information of the terminal using an output result of location measurement unit 406. Location measurement unit 406 may use GPS (Global Positioning System) or the like, or may use a wireless communication device or the like such as Wifi.

Power grid 500 includes, for example, a power system constituted of a power generation station including a power generation device for generating power, and a power transmission/distribution facility including a power transmission line, a substation, a power distribution line, and the like, and is connected to a power line installed in shop 2 so as to exchange power.

Electrically powered vehicle 100 includes inlet 62, power conversion device 70, and battery 110.

Battery 110 is a rechargeable DC power supply, and is, for example, a secondary battery such as a nickel-metal hydride battery or a lithium ion battery including a solid or liquid electrolyte. It should be noted that battery 110 is an exemplary power storage device that stores power, and is not limited to the secondary battery. For example, instead of battery 110, a capacitor or the like may be used as the rechargeable DC power supply.

Connector 201 of power charging/discharging station 200 is attached to inlet 62. Inlet 62 has a structure to and from which connector 201 is attachable and detachable.

When power becomes exchangeable between inlet 62 and power conversion device 70, power conversion device 70 is operated to bring into a state in which charging power can be supplied from inlet 62 to battery 110 (i.e., a state in which charging control can be performed) or a state in which feeding power can be supplied from battery 110 to inlet 62 (i.e., a state in which feeding control can be performed).

When the electrical connection between inlet 62 and power conversion device 70 is disconnected, the supply of charging power from power grid 500 to battery 110 via inlet 62 becomes impossible or the supply of feeding power from battery 110 to inlet 62 becomes impossible.

Power charging/discharging station 200 includes a controller and a communication device (both not shown). The controller includes a CPU (Central Processing Unit) and a memory (including a ROM (Read Only Memory), a RAM (Random Access Memory), or the like, for example). The controller controls each of devices of power charging/discharging station 200 based on information such as a signal from each of various types of sensors provided in power charging/discharging station 200, and a map and a program stored in the memory. Various types of controls performed by the controller are not limited to processes by software, and can be performed through processes by dedicated hardware (electronic circuit).

The controller calculates an SOC (state of charge) of battery 110 based on a detection value detected by a current sensor, a voltage sensor, or the like. As a method of calculating the SOC, for example, various known methods can be employed, such as a method using current value integration (coulomb count) or a method using estimation of an open circuit voltage (OCV). It should be noted that the SOC of battery 110 may be calculated in electrically powered vehicle 100 and transmitted to power charging/discharging station 200, or may be calculated in server 300, for example.

The communication device is configured to perform bidirectional communication with server 300 via communication network 600, for example.

Server 300 manages, as one of a plurality of energy resources, a battery (for example, battery 110) of an electrically powered vehicle (for example, electrically powered vehicle 100) connected to shop 2. For example, server 300 performs charging or discharging in the plurality of energy resources including battery 110 mounted in electrically powered vehicle 100 connected to shop 2, thereby changing an amount of demand of power in power grid 500 to smooth the demand of power (supply/demand adjustment).

Server 300 includes a control unit 302, a communication unit 304, and a storage unit 306. Control unit 302 includes a CPU (not shown) and the like, and is configured to perform a predetermined arithmetic process based on information stored in storage unit 306, information received from power charging/discharging station 200 via communication unit 304, information received from shop terminal 2a via communication unit 304, or the like.

Communication unit 304 is configured to perform communication with each of power charging/discharging station 200 and shop terminal 2a via communication network 600. Communication unit 304 and a device with which the communication is made exchange information with each other in accordance with a predetermined communication method. It should be noted that the predetermined communication method may be wired communication or wireless communication, for example.

Storage unit 306 includes, for example, a large-capacity storage device such as a hard disk or a solid-state drive in addition to the above-described memory. Storage unit 306 stores, for example, a history of communication such as a state (for example, SOC or the like) of battery 110 of electrically powered vehicle 100, and stores information (for example, reservation information or the like) received from shop terminal 2a.

Shop terminal 2a includes a control unit 2d, a storage unit 2e, and a communication unit 2f. Control unit 2d includes a CPU (not shown) and the like, and is configured to perform a predetermined arithmetic process based on payment information or settlement information acquired from register 2b via communication unit 2f, information received from server 300 via communication unit 2f, or the like.

Storage unit 2e includes, for example, a storage device similar to storage unit 306 described above. Storage unit 2e stores, for example, the user's reservation information received from user terminal 400.

Communication unit 2f is configured to perform communication with each of communication unit 304 of server 300 and communication unit 404 of user terminal 400 via communication network 600. Communication unit 2f and a device with which the communication is made exchange information with each other in accordance with predetermined wireless communication.

User terminal 400 includes a control unit 402, a communication unit 404, and a location measurement unit 406. Control unit 402 includes a CPU (not shown) and the like, and is configured to perform a predetermined arithmetic process based on location information acquired by location measurement unit 406, information received from server 300 via communication unit 404, or the like.

Location measurement unit 406 acquires location information of user terminal 400. The acquired location information is transmitted to control unit 402, is transmitted to shop terminal 2a via communication unit 404, or is stored in a storage unit (not shown).

Communication unit 404 is configured to perform communication with communication unit 2f of shop terminal 2a via communication network 600. Communication unit 404 and a device with which the communication is made exchange information with each other in accordance with predetermined wireless communication.

In shop 2 of power management system 1 having the above configuration, power charging/discharging station 200 is set as described above. In order to efficiently charge batteries mounted in a plurality of electrically powered vehicles that visit shop 2, a time slot for use is reserved in advance and a battery of a corresponding electrically powered vehicle is charged in the reserved time slot, with the result that a waiting time due to charging of another electrically powered vehicle can be suppressed from being increased. When there are a plurality of such power charging stations, it is required to appropriately manage a status of reservation.

However, since the user who has reserved the use of the power charging station as described above tends to make a reservation to use it in a spare time, the reservation for the use of the power charging station may be canceled when another event comes up in that spare time. Therefore, the facility such as the power charging station may be unable to be used efficiently.

To address this, in the present embodiment, server 300 performs supply/demand adjustment using battery 110 while battery 110 of electrically powered vehicle 100 and power charging/discharging station 200 are connected to each other after the reservation for the use of shop 2 is made by the user.

With this, there is a low possibility that the user having made the reservation puts another event on his/her schedule in the time slot for which the user has reserved the facility. Therefore, since the supply/demand adjustment using battery 110 of electrically powered vehicle 100 is performed while battery 110 of electrically powered vehicle 100 and power charging/discharging station 200 are connected to each other, the electrically powered vehicle can be suppressed from leaving during the supply/demand adjustment. Thus, the power charging/discharging station can be efficiently used.

In shop terminal 2a, outbound information is transmitted to the user, reservation for use of shop 2 is received, or reservation information is transmitted to server 300. In server 300, supply/demand adjustment is performed using the received reservation information.

Figure 2:
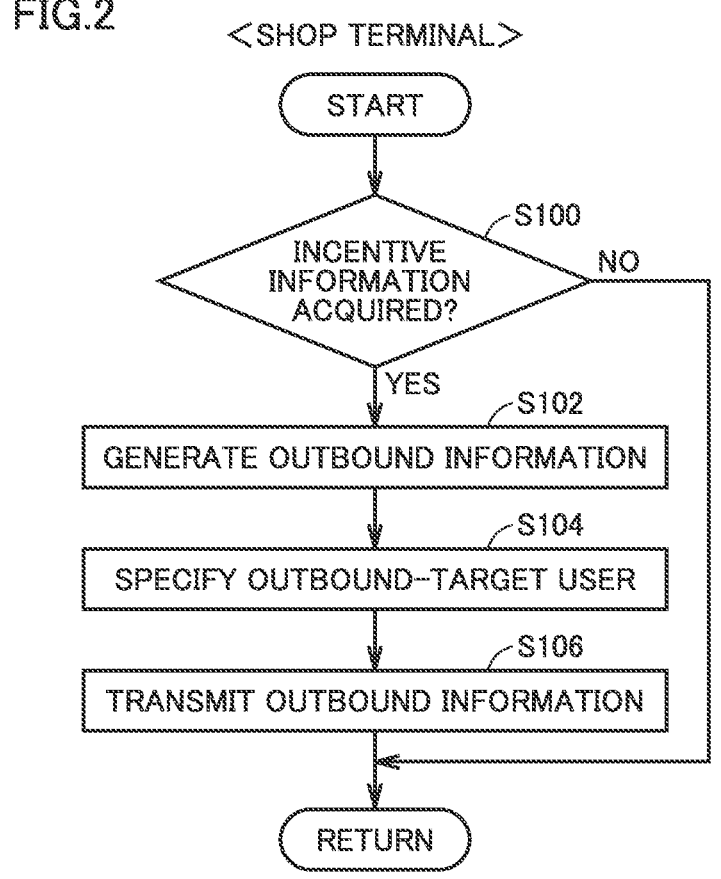
FIG. 2 is a flowchart showing an exemplary process performed in a shop terminal to transmit outbound information to a user.

Hereinafter, a process performed in each of shop terminal 2a and server 300 will be described. An exemplary process performed by shop terminal 2a to transmit the outbound information to the user will be described with reference to FIG. 2. FIG. 2 is a flowchart showing the exemplary process performed in shop terminal 2a to transmit the outbound information to the user. A series of processes shown in this flowchart are repeatedly performed at predetermined intervals by shop terminal 2a.

In a step (hereinafter, the term "step" will be abbreviated as S) 100, shop terminal 2a (specifically, control unit 2d of shop terminal 2a) determines whether or not incentive information for each time slot is acquired from server 300. For example, the incentive information for each time slot includes: information about a time slot in which a reward for participating in a DR request in one day is to be obtained; and information about a time slot in which no reward is to be obtained. The time slot is constituted of, for example, a period from a start time to an end time, and is set in advance so as not to overlap with other time slots. The time slot may include, for example, a morning time slot, a daytime slot, an evening time slot, and a nighttime slot, or may include a time slot for each predetermined time. For example, server 300 may transmit the incentive information whenever a predetermined time elapses, or shop terminal 2a may request server 300 to transmit the incentive information whenever a predetermined time elapses. When it is determined that the incentive information for each time slot is acquired from server 300 (YES in S100), the process proceeds to S102.

In S102, shop terminal 2a generates the outbound information. The outbound information to be transmitted to the user of shop 2 is generated. The user of shop 2 includes, for example, a member registered in advance as the user of shop

2. Shop terminal 2a generates the outbound information to be transmitted to a message transmission destination (for example, user terminal 400) included as membership information. The outbound information includes, for example, information indicating that a reward to be obtained by the user participating in a DR request in a specific time slot is higher in value than those in other time slots. The reward to be obtained by the user may be, for example, a point used for discounting a price of a product or a fee of a service in shop 2, a discount rate for a price of a product or a fee of a service, or a discount amount for a price of a product or a fee of a service.

In S104, shop terminal 2a specifies an outbound-target user. For example, shop terminal 2a specifies a user, who is a target to which the outbound information is to be transmitted, by using results of past use by a plurality of members registered in advance. For example, as the outbound-target user, shop terminal 2a may specify a user having made purchases in shop 2 with an accumulated amount of money equal to or more than a threshold value in a recent predetermined period. Alternatively, as the outbound-target user, shop terminal 2a may specify a user having used shop 2 (user who has purchased a product or user who has received a service) within a recent predetermined period. Alternatively, shop terminal 2a may specify each of all the members as the outbound-target user.

In S106, shop terminal 2a transmits the outbound information to the user terminal of the user as the transmission destination. Shop terminal 2a transmits the outbound information generated in S102 to the user terminal of the outbound-target user specified in S104. It should be noted that when it is determined that the incentive information is not acquired (NO in S100), this process is ended.

Figure 3:
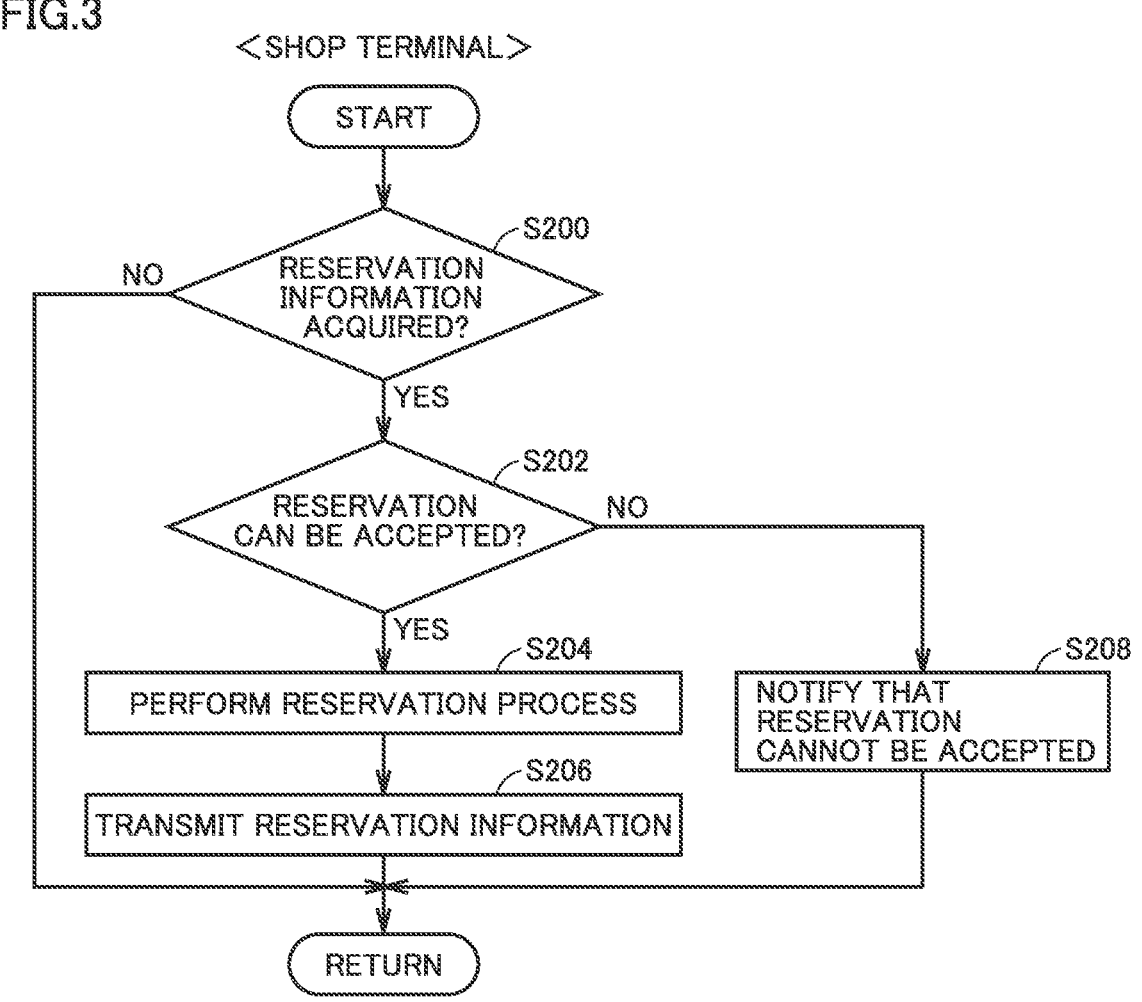
FIG. 3 is a flowchart showing an exemplary reservation accepting process performed in the shop terminal.

Next, an exemplary reservation accepting process performed in shop terminal 2a to accept a reservation will be described with reference to FIG. 3. FIG. 3 is a flowchart showing the exemplary reservation accepting process performed in shop terminal 2a. A series of processes shown in this flowchart are repeatedly performed at predetermined intervals by shop terminal 2a.

In S200, shop terminal 2a determines whether or not reservation information is received. For example, when shop terminal 2a receives data indicating the reservation information from user terminal 400 via communication network 600, shop terminal 2a determines that the reservation information is received. The reservation information includes: information about a time slot in which shop 2 is to be used; information for specifying the user; and information about whether to participate in supply/demand adjustment in response to a DR request during the use of shop 2. The information for specifying the user may include information about a membership number or may include personal information about the user such as a telephone number, for example. Whether to participate in the supply/demand adjustment during the use of shop 2 is confirmed by the user as one of confirmation items when other pieces of the reservation information are input using user terminal 400, for example. The reservation information may include: information about the SOC of battery 110 of electrically powered vehicle 100 as acquired by user terminal 400 communicating with electrically powered vehicle 100; and information by which a distance to shop 2 can be acquired, such as the location information of electrically powered vehicle 100 as acquired by location measurement unit 406. When it is determined that the reservation information is received (YES in S200), the process proceeds to S202.

In S202, shop terminal 2a determines whether or not the reservation can be accepted. Specifically, shop terminal 2a determines that the reservation cannot be accepted when the time slot for the reservation in the received reservation information overlaps with a time slot for which a reservation has been already made by another user. Shop terminal 2a determines that the reservation can be accepted when the time slot for the reservation is a vacant time slot for which no reservation has been made by another user. When it is determined that the reservation can be accepted (YES in S202), the process proceeds to S204.

In S204, shop terminal 2a performs a reservation process using the reservation information. Shop terminal 2a reads out, from the received reservation information, the time slot for the reservation and the information specifying the user, and stores the time slot for the reservation (including information about a start time and an end time) and the information specifying the user into storage unit 2e in association with each other. Thereafter, the process proceeds to S206.

In S206, shop terminal 2a transmits the reservation information to server 300. Shop terminal 2a may transmit the received reservation information to server 300 whenever shop terminal 2a receives the reservation information from the user terminal, or may transmit a plurality of pieces of reservation information to server 300 whenever a predetermined period elapses or whenever shop terminal 2a receives a predetermined number of pieces of reservation information, for example. Thereafter, this process is ended. It should be noted that when it is determined that the reservation cannot be accepted (NO in S202), the process proceeds to S208.

In S208, shop terminal 2a notifies that the reservation cannot be accepted. Specifically, shop terminal 2a transmits, to user terminal 400 having transmitted the reservation information, information indicating that the reservation cannot be accepted. Thereafter, this process is terminated.

Figure 4:
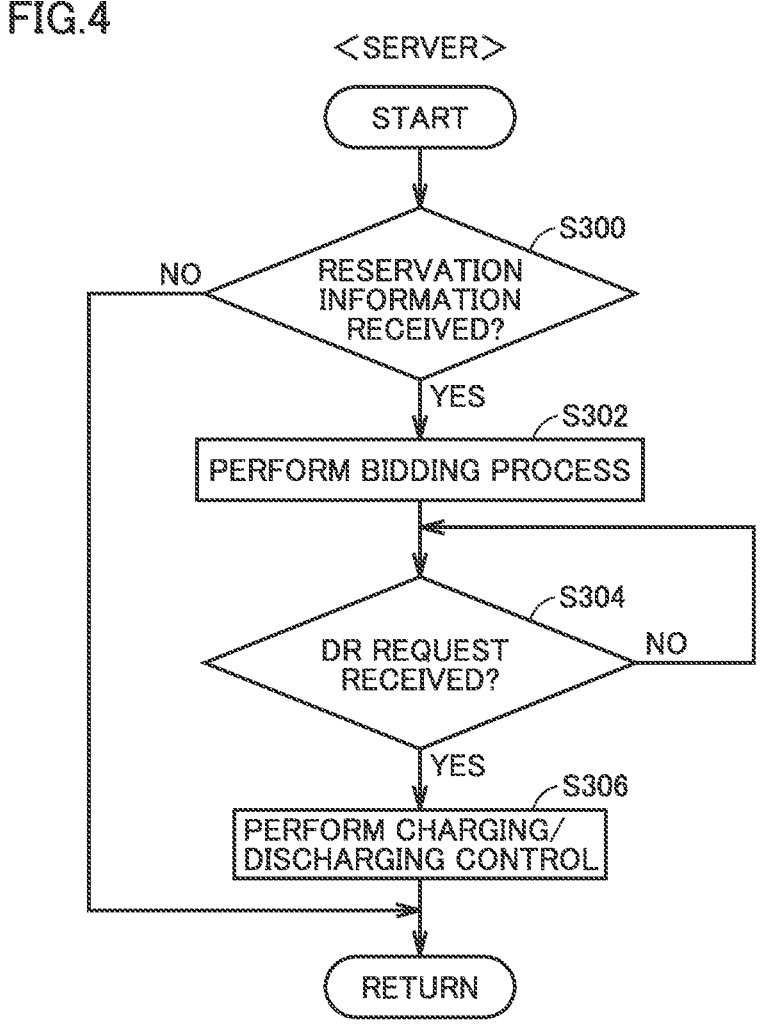
FIG. 4 is a flowchart showing an exemplary charging/discharging process performed in the server.

Next, an exemplary charging/discharging process performed in server 300 to perform charging/discharging control in response to a DR request will be described with reference to FIG. 4. FIG. 4 is a flowchart showing the exemplary charging/discharging process performed in server 300. A series of processes shown in this flowchart are repeatedly performed at predetermined intervals by server 300.

In S300, server 300 (specifically, control unit 302 of server 300) determines whether or not reservation information is received. Server 300 determines whether or not data indicating the reservation information is received from shop terminal 2a via communication network 600. When it is determined that the reservation information is received (YES in S300), the process proceeds to S302.

In S302, server 300 performs a bidding process. Server 300 uses the received reservation information to set a control reserve with a small-scale power supply facility to be controlled. Server 300 sets the control reserve based on an amount of power that can be exchanged by the small-scale power supply facility to be controlled. The amount of power that can be exchanged by the small-scale power supply facility is calculated by using, for example, an SOC of a power storage device provided in the small-scale power supply facility. The control reserve includes not only a power adjustment range but also a plurality of types of control reserves (primary, secondary, and tertiary control reserves) that differ depending on responsiveness. Server 300 bids, as a bidding price, for a power fee that can be realized by the set control reserve. When the bid of server 300 is accepted as an entity for providing the control reserve, server 300 is determined as one of entities for which a DR request is to be made.

In S304, server 300 determines whether or not a DR request is received. When server 300 receives data indicating the DR request from an upper-level aggregator via communication network 600, server 300 determines that the DR request is received. When it is determined that the DR request is received (YES in S304), the process proceeds to S306.

In S306, server 300 performs charging/discharging control. Specifically, in accordance with the DR request, server 300 outputs a charging/discharging control execution command to the small-scale power supply facility to be controlled, with the result that the charging/discharging control is performed in each of the plurality of power storage devices included in the small-scale power supply facility.

Server 300 realizes the control reserve requested by the DR request in the time slot requested by the DR request, by using part or whole of a plurality of small-scale power supply facilities, for example. For example, in accordance with the DR request, server 300 sets a time slot in which the charging/discharging control is to be performed in each of the plurality of small-scale power supply facilities and sets a power charging/discharging amount in each of the plurality of small-scale power supply facilities. In accordance with the set time slot and power charging/discharging amount, server 300 outputs the charging/discharging control execution command to the small-scale power supply facility to be controlled.

For example, by using the reservation information, server 300 sets, within the period in which electrically powered vehicle 100 is scheduled to be connected to power charging/discharging station 200, the time slot in which the charging/discharging control is to be performed. Server 300 sets, within at least the period of use of shop 2 for which the reservation has been made, the time slot in which the charging/discharging control is to be performed. Server 300 specifies the period of use of shop 2 for which the reservation has been made, in accordance with the start time and the end time included in the reservation information. Further, based on the period of use of shop 2 and the SOC of battery 110, server 300 sets an amount of power (power charging/discharging amount) to be exchanged with power grid 500 by the charging/discharging control, for example.

Server 300 calculates, for example, a first chargeable power amount calculated from the period of use of shop 2 and the upper limit value of the charging power in power charging/discharging station 200, and a first dischargeable power amount calculated from the period of use of shop 2 and the lower limit value of the discharging power in power charging/discharging station 200. Server 300 calculates a second chargeable power amount using a difference between the present SOC of battery 110 and the upper limit value of the SOC, and calculates a second dischargeable power amount using a difference between the present SOC of battery 110 and the lower limit value of the SOC, for example. For example, server 300 sets a smaller one of the first chargeable power amount and the second chargeable power amount as the upper limit value of the chargeable power amount. Server 300 sets a smaller one of the first dischargeable power amount and the second dischargeable power amount as the upper limit value of the dischargeable power amount. In this way, server 300 sets the power charging/discharging amount for battery 110.

Server 300 outputs a charging/discharging control execution command to power charging/discharging station 200 when the set time slot comes, and stops the output of the charging/discharging control execution command or outputs a charging/discharging control execution stop command when the set time slot has elapsed. It should be noted that when it is determined that the reservation information is not received (NO in S300), this process is ended. When it is determined that no DR request is received (NO in S304), the process returns to S304.

Figures 5, 6:
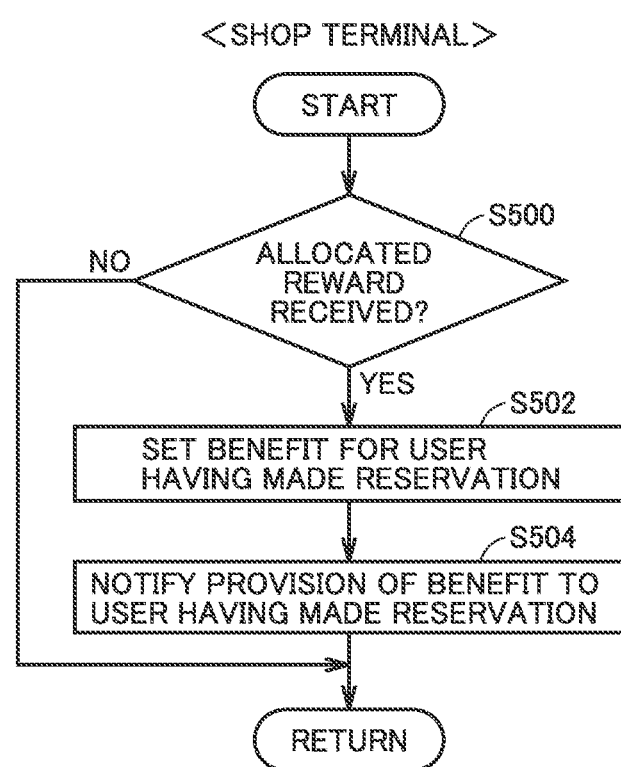
FIG. 5 is a flowchart showing an exemplary allocation process performed in the server.
FIG. 6 is a flowchart showing an exemplary provision process performed in the shop terminal.

Next, an exemplary allocation process performed in server 300 to allocate a reward for control reserve will be described with reference to FIG. 5. FIG. 5 is a flowchart showing the exemplary allocation process performed in server 300. A series of processes shown in this flowchart are repeatedly performed at predetermined intervals by server 300.

In S400, server 300 determines whether or not a control reserve reward is received. For example, when server 300 receives data indicating a reward for providing the control reserve in response to the DR request from the upper-level aggregator, server 300 determines that the control reserve reward is received. When it is determined that the control reserve reward is received (YES in S400), the process proceeds to S402.

In S402, server 300 performs a reward allocation process. Specifically, server 300 performs, as the reward allocation process, a process of allocating a reward to each of the plurality of small-scale power supply facilities in accordance with results of participation in DR requests. The reward may be set as an amount of money, the number of scores, or the number of points, for example.

In S404, server 300 transmits the allocated reward. Server 300 transmits data indicating the allocated reward to each of the plurality of small-scale power supply facilities having participated in the DR request.

Next, an exemplary provision process performed in shop terminal 2a to provide a benefit to the user will be described with reference to FIG. 6. FIG. 6 is a flowchart showing the exemplary provision process performed in shop terminal 2a. A series of processes shown in this flowchart are repeatedly performed at predetermined intervals by shop terminal 2a.

In S500, shop terminal 2a determines whether or not the allocated reward is received. For example, when shop terminal 2a receives data indicating the allocated reward from server 300 via communication network 600, shop terminal 2a determines that the allocated reward is received. When it is determined that the allocated reward is received (YES in S500), the process proceeds to S502.

In S502, shop terminal 2a sets a benefit for the user having made the reservation. For example, shop terminal 2a may provide a point corresponding to the contribution of the user having made the reservation in the allocated reward, to a point included in the membership information of the user having made the reservation. Alternatively, for example, shop terminal 2a may set, as a discount amount, an amount of money corresponding to the contribution of the user having made the reservation, and may discount, by the amount of money, a price to be paid in a subsequent settlement process by the user having made the reservation. Alternatively, for example, shop terminal 2a may set a discount rate using the contribution of the user having made the reservation, and discount, by an amount of money corresponding to the discount rate, a price to be paid in a subsequent settlement process by the user having made the reservation. The contribution of the user having made the reservation is calculated, for example, in server 300 or shop terminal 2a using the amount of power exchanged between the battery mounted in the electrically powered vehicle of the user having made the reservation and the power grid. Thereafter, the process proceeds to S504.

In S504, shop terminal 2a notifies the provision of the benefit to the user having made the reservation. Shop terminal 2a notifies the provision of the benefit to the user having made the reservation by transmitting predetermined data to user terminal 400 of the user having made the reservation so as to display, on a display unit, a notification indicating that the benefit has been provided, or by transmitting a message such as a mail to a transmission destination set by the user at the time of membership registration.

Figure 7:
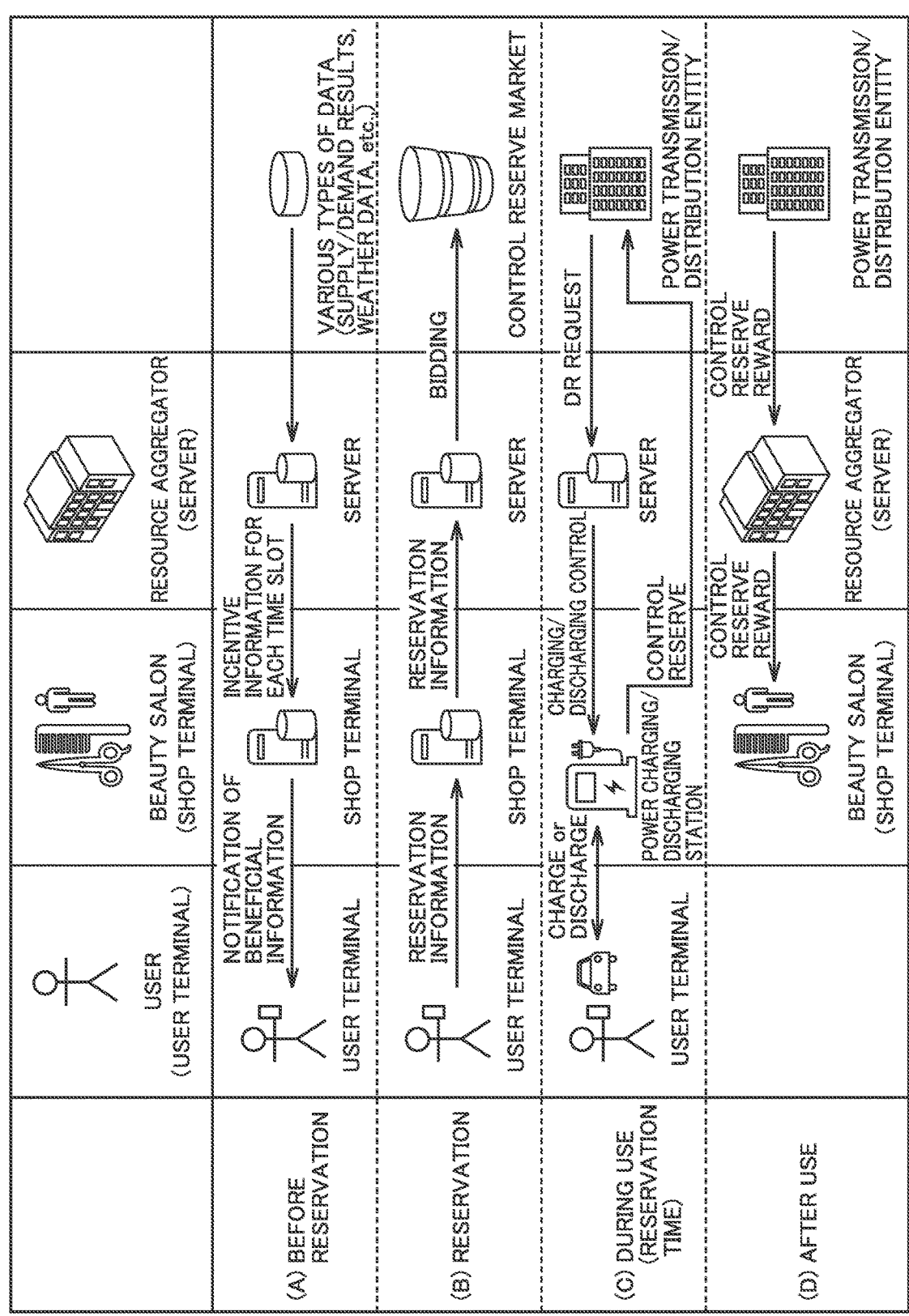
FIG. 7 is a diagram for illustrating exemplary operations of the user, the shop terminal, and the server.

Exemplary operations of shop terminal 2a and server 300 based on the above-described structures and flowcharts will be described with reference to FIG. 7. FIG. 7 is a diagram for illustrating exemplary operations of the user, shop terminal 2a, and server 300. FIG. 7 exemplarily illustrates a case where shop 2 is a beauty salon.

<(A) As to Operation Before Reservation>

As shown in (A) of FIG. 7, for example, server 300 predicts a change in an amount of demand of power and a change in amount of supply of power in one day or a predetermined period by using data such as supply/demand results and weather history information stored in a predetermined database (not shown). For example, server 300 sets, as a target time slot for DR request, a time slot in which the amount of demand exceeds the amount of supply by a predetermined value or more, or a time slot in which the amount of supply exceeds the amount of demand by a predetermined value or more. Server 300 transmits, to shop terminal 2a, information about an incentive for each time slot, the information including information about the target time slot for DR request and information about an incentive in the time slot.

When the incentive information is acquired in shop terminal 2a (YES in S100), outbound information for the user is generated (S102). On this occasion, the outbound information is generated using the incentive information to have a content for promoting a reservation for use in the time slot in which the incentive is to be obtained (target time slot for DR request). The user of the transmission destination is specified (S104), and the outbound information is transmitted as a "notification of beneficial information" to user terminal 400 of the specified user (S106).

<(B) As to Operation of Reservation>

As shown in (B) of FIG. 7, when the user makes a reservation for use of the beauty salon, reservation information is transmitted from user terminal 400 to shop terminal 2a, the reservation information including information about a desired time slot, information specifying the user, and information about whether to participate in supply/demand adjustment using electrically powered vehicle 100 during the use of the beauty salon.

When the reservation information is acquired in shop terminal 2a (YES in S200), it is determined whether or not the reservation can be accepted (S202). For example, when the use thereof is possible in the time slot desired by the user included in the reservation information, it is determined that the reservation can be accepted (YES in S202), and the reservation process using the reservation information is performed (S204). After the reservation process is performed, the reservation information is transmitted to server 300 (S206).

It should be noted that when the use thereof is impossible in the time slot desired by the user included in the reservation information, information indicating that the reservation cannot be accepted is notified (S208). Specifically, the information indicating that the reservation cannot be accepted is transmitted to user terminal 400 of the user included in the reservation information.

When server 300 receives the reservation information (YES in S300), the bidding process is performed (S302), and it is determined whether or not a DR request is received after completion of the bidding process (S304). When the DR request is received from the upper-level aggregator (YES in S304), charging/discharging control is performed (S306).

<(C) As to Operation During Use (Reservation Time)>

As shown in (C) of FIG. 7, it is assumed that the user uses electrically powered vehicle 100 to move to shop 2, which is the beauty salon, and the user parks electrically powered vehicle 100 in parking lot 3 of shop 2. The user connects connector 201 to inlet 62 of electrically powered vehicle 100, and then moves to shop 2. When connector 201 is connected to inlet 62 of electrically powered vehicle 100, power charging/discharging station 200 supplies power to charge battery 110. On this occasion, power charging/discharging station 200 may calculate the SOC of battery 110 of electrically powered vehicle 100, or may receive information about the SOC of battery 110 from electrically powered vehicle 100.

It should be noted that when the charging/discharging control according to the DR request is performed in accordance with the execution command from server 300 during the use of shop 2 by the user (S306), power is supplied from battery 110 mounted in electrically powered vehicle 100 to power grid 500, or battery 110 is charged using the power from power grid 500, thereby making adjustment to attain a small difference between the amount of demand and the amount of supply in power grid 500.

<(D) As to Operation After Use>

As shown in (D) of FIG. 7, after using shop 2, the user removes connector 201 of power charging/discharging station 200 from electrically powered vehicle 100 and then moves using electrically powered vehicle 100.

Information about a reward (control reserve reward) corresponding to the contribution to the DR request is transmitted from the power transmission/distribution entity (or the upper-level aggregator) to server 300. When the control reserve reward is received in server 300 (YES in S400), the reward allocation process is performed (S402), and the reward allocated by the reward allocation process is transmitted to each small-scale power supply facility managed by server 300 (S404).

When shop terminal 2*a* receives the allocated reward (YES in S500), a benefit for the user having made the reservation is set (S502). For example, a point corresponding to the contribution of the user having made the reservation is provided. Then, information about the benefit set for the user is notified to the user (S504).

In the manner described above, according to the power management system of the present embodiment, there is a low possibility that the user having made the reservation for the use of shop 2 puts another event on his/her schedule in the time slot for which the user has made reservation. Therefore, while the battery of electrically powered vehicle 100 and power charging/discharging station 200 are connected to each other, the supply/demand adjustment using battery 110 of electrically powered vehicle 100 is performed, thereby suppressing electrically powered vehicle 100 from leaving during the supply/demand adjustment. Thus, power charging/discharging station 200 can be efficiently used. Therefore, it is possible to provide a power management system that efficiently uses a facility such as a power charging station.

Further, since the process of providing the user of shop 2 with the reward such as the point corresponding to the contribution to the supply/demand adjustment is performed, the user can receive the reward. Therefore, the number of users of shop 2 can be increased.

Further, by using the outbound information to promote the user to use shop 2 in the time slot in which the reward for the supply/demand adjustment is to be obtained, shop 2 can be used by the user in the time slot. Therefore, battery 110 of electrically powered vehicle 100 of the user of shop 2 can be used for the supply/demand adjustment.

Hereinafter, modifications will be described.

In the above-described embodiment, it has been described that the SOC of battery 110 of electrically powered vehicle 100 connected to power charging/discharging station 200 is calculated; however, the SOC of battery 110 may be calculated in electrically powered vehicle 100 and power charging/discharging station 200 may acquire information about the SOC from electrically powered vehicle 100, for example. Alternatively, the reservation information may include information about the SOC of electrically powered vehicle 100. On this occasion, for example, user terminal 400 may acquire the information about the SOC of battery 110 from electrically powered vehicle 100. When the reservation information includes the information about the SOC, server 300 desirably estimates the SOC in consideration of an amount of decrease of the SOC when electrically powered vehicle 100 travels to shop 2, and desirably sets the control reserve with each small-scale power supply facility. The amount of decrease is estimated, for example, by using a distance between electrically powered vehicle 100 and shop 2.

Further, in the above-described embodiment, it has been described that the incentive for the contribution of the user is provided by way of cash, point, discount amount, or discount rate; however, a good corresponding to the contribution may be provided as the incentive to the user, for example.

Further, in the above-described embodiment, it has been described that the reservation information is transmitted to server 300 after completion of the reservation process; however, information indicating that the reservation has been completed may be transmitted to user terminal 400 after the completion of the reservation process.

Further, in the above-described embodiment, the reservation information is transmitted to server 300 after completion of the reservation process; however, the reservation information transmitted to server 300 may be the same information as the reservation information received from user terminal 400, or may be information obtained by adding other information thereto, and is not limited to the same information.

Further, in the above-described embodiment, it has been illustratively described that shop terminal 2*a* that manages the status of reservation of the user and server 300 that manages the small-scale power supply facilities including power charging/discharging station 200 of shop 2 are implemented by individual computers; however, shop terminal 2*a* and server 300 may be implemented by one computer.

Further, in the above-described embodiment, the information about the time slot in which the reward is to be obtained is provided to the user by transmitting the outbound information to the user terminal of the user; however, the information about the time slot in which the reward is to be obtained may be provided to a viewer of a homepage managed by shop 2 by displaying, on the homepage, the information about the time slot in which the reward is to be obtained, for example.

It should be noted that the above-described modifications may be implemented by appropriately combining whole or part of the modifications.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power management system comprising:

a power charging/discharging station installed in a parking space of a facility and connected to a power grid; and a server that manages a status of reservation of the facility by a user who uses a vehicle in which a power storage device is mounted and that performs supply/demand adjustment for power in the power grid, wherein the server includes a first server that manages the status of reservation of the facility, and a second server that is capable of communicating with the first server and that performs the supply/demand adjustment, when the reservation for the use of the facility is made by the user, the second server sets, within a time slot of the reservation, a period during which the supply/demand adjustment is to be performed, the second server performs the supply/demand adjustment using the power storage device of the vehicle while the power storage device and the power charging/discharging station are connected to each other after the reservation for use of the facility is made by the user, the second server transmits, to the first server, information specifying the user who uses the vehicle used for the supply/demand adjustment, the first server performs, using the information received from the second server, a process of providing the user with a reward corresponding to a contribution to the supply/demand adjustment, and the reward includes a benefit available at the facility only.

2. The power management system according to claim 1, wherein when the first server receives, from the second server, information about a time slot in which a reward for the supply/demand adjustment is to be obtained, the first server provides information for promoting the use of the facility in the time slot.

* * * * *